UNITED STATES PATENT OFFICE

2,634,254

POLYMERIZATION OF SULFUR DIOXIDE WITH CARBON MONOXIDE AND THREE-COMPONENT SOLID POLYMERS THEREOF WITH A MONOOLEFINIC HYDROCARBON

Robert D. Lipscomb, Wilmington, Del., assignor to E. I. du Pont de Nemours and Company, Wilmington, Del., a corporation of Delaware No Drawing. Application November 6, 1950, Serial No. 194,387

10 Claims. (Cl. 260—63)

This invention relates to new polymers of carbon monoxide and to methods for their preparation.

The versatility of carbon monoxide as a chemical reagent has been recognized for many years, and important industries have been built around its chemistry. It remained for M. M. Brubaker to discover that carbon monoxide was a polymerizable monomer and was capable of entering into polymerization reactions with ethylenically unsaturated monomers to produce a new family of polymers. These new polymers and methods for their preparations are disclosed and claimed in U. S. Patent 2,495,286 which was issued to M. M. Brubaker on January 24, 1950. However, carbon monoxide has hitherto been unknown to polymerize with sulfur dioxide.

It is an object of this invention to provide new polymers of carbon monoxide and methods for their preparation. A further object is to provide a process for polymerizing sulfur dioxide with carbon monoxide. A still further object is to provide new polymers from carbon monoxide, an ethylenically unsaturated monomer, and sulfur dioxide. Other objects will appear hereinafter.

The objects of this invention are accomplished by providing new polymers of carbon monoxide with sulfur dioxide and a polymerizable unsaturated compound containing ethylenic unsaturation as the sole aliphatic carbon-to-carbon unsaturation and which undergoes additional polymerization. It has now been discovered that sulfur dioxide can be made to enter into reactions involving carbon monoxide if there is included in the reaction system a polymerizable organic compound containing ethylenic unsaturation as the sole aliphatic carbon-to-carbon unsaturation and which is recognized by the art as being capable of undergoing a polymerization reaction involving addition across the ethylenic double bond, which reaction is catalyzed by peroxy compounds.

In preparing the new polymers of this invention a pressure reactor is deoxygenated by flushing it with oxygen-free nitrogen and charged with a reaction medium containing a weighed amount of sulfur dioxide in solution. A predetermined amount of a free-radical generating catalyst is added, and the reactor is closed. Carbon monoxide is added at room temperature to the desired pressure. Thereafter an amount of the ethylenically unsaturated organic compound is added to give the desired carbon monoxide/ethylenically unsaturated organic compound mole ratio. The reactor is placed in an agitating rack fitted with heating means. The reaction mixture is maintained at the temperature selected for reaction until the desired degree of reaction has taken place. Thereafter the reactor is permitted to cool, opened, and the contents discharged. The product is isolated by evaporation of the reaction medium, by drowning in a non-solvent, or by other means known to those skilled in the art.

The examples which follow are submitted to illustrate and not to limit this invention. Unless otherwise stated, parts are by weight.

Example I

A silver-lined pressure reactor was charged with 50 parts of water, 5 parts of sulfur dioxide and 1 part of alpha,alpha'-azodiisobutyronitrile. The reactor was closed and carbon monoxide admitted to a pressure of 200 atm. Ethylene was added until the total pressure within the vessel was 400 atm. Agitation was started, and heat was applied to maintain the temperature in the range of 80–90° C. These conditions were maintained for 6 hours. The reactor was permitted to cool, opened and the contents discharged. There was obtained 11.5 parts of a light tan powder, after water had been removed by evaporation. The product obtained was found to contain 10.7% sulfur. Extraction with xylene dissolved 14% of the product. The insoluble residue was extracted with hot chloroform and 25% of it was found to be soluble. This fraction contained 0.4% sulfur. A second chloroform extraction dissolved an additional 7% which analyzed 0.9% sulfur. The insoluble residue amounted to 46% and contained 14.5% sulfur.

Example II

In a manner similar to Example I, 50 parts of benzene, 2.5 parts of sulfur dioxide, and 1 part of alpha,alpha'-azodiisobutyronitrile were placed in the reaction vessel, and carbon monoxide was added to obtain 300 atm. pressure. The reactor was heated to 80° C., and ethylene was injected to a total pressure of 700 atm. After reaction was complete, as indicated by cessation of pressure drop, the reactor was opened, and the product was isolated. After removal of the benzene, there remained 30 parts of a white solid which analyzed 2.2% sulfur and which was soluble in hot xylene to the extent of 2%. Extraction of the product with hot chloroform dissolved an additional 1% which contained 0.4% sulfur. The insoluble residue was extracted with hot dimethylformamide, in which it was soluble to the extent of 20%, this fraction containing 0.6% sulfur. The insoluble residue, which amounted to about 80%, contained 3.6% sulfur.

*Example III*

A pressure reactor was charged with 50 parts of cyclohexane, 0.25 part of sulfur dioxide, and 1 part of 1,1'-azodicyclohexanecarbonitrile. The reactor was pressured to 300 atm. with carbon monoxide, and ethylene was added to a total pressure of 470 atm. The charge was heated at 100° C. for 10 hours with agitation. The yield was 16.2 parts of a polymer which did not melt when heated at 240° C., which analyzed 0.3% sulfur, and which could be pressed into clear films.

*Example IV*

A pressure reactor was charged with 50 parts of cyclohexane, 0.1 part of sulfur dioxide and 0.75 part of di-(tertiary butyl) peroxide. The reaction vessel was charged with 300 atm. of carbon monoxide, and ethylene was injected so that the total pressure amounted to 550 atm. The charge was heated at 130° C. for 8.5 hours. The product, after removal of the cyclohexane, was a tan solid amounting to 30.5 parts. Analysis showed this product to contain 0.2% sulfur. When a film of the product was heated on a metal block it showed no sticking below 165° C.

The examples have illustrated the use of certain conditions of temperature, pressure, catalyst concentration, mode of operation, and the like. It is to be understood that departures may be had from these within the scope of this invention.

The ethylenically unsaturated organic compounds are those which have the group >C=C< as the sole aliphatic carbon-to-carbon unsaturation. A class of these compounds are the aliphatic monoolefins containing from 2 to 4 carbon atoms, such as ethylene, propylene, the butylenes; the butadienes, such as butadiene, isoprene, etc.; vinyl and vinylidene compounds, such as halogenated ethylenes, e. g., vinyl fluoride, vinylidene fluoride, trifluoroethylene, tetrafluoroethylene, vinyl chloride, vinylidene chloride, vinylacetylene, 1-chloro-1-fluoroethylene, etc., vinyl organic esters such as vinyl acetate, vinyl propionate, vinyl benzoate, vinyl laurate, vinyl trimethylacetate, vinyl camphorate, etc., vinyl ketones such as methyl vinyl ketone, propyl vinyl ketone, etc., acrylic and methacrylic acids and their derivatives such as esters, nitriles, amides, and imides, etc., diallyl compounds such as diallyl phthalate, diallyl succinate, etc., butenedioic acids and their derivatives such as maleic and fumaric acids, maleic anhydride, methyl hydrogen maleate, dimethyl maleate, dipropyl fumarate, fumaronitrile, maleonitrile, and the like. Combinations of two or more of the above polymerizable organic compounds can be used, if desired. Organic compounds which contain a terminal methylene group are preferred in the preparation of the polymers of this invention since the most satisfactory results with respect to yield and polymer quality are obtained when such compounds are used.

As catalysts there can be used any material which is capable of yielding unstable free radicals under the conditions of reaction. Examples of such are azo compounds of the kind disclosed in U. S. Patent 2,471,959, such as, alpha,alpha'-azobis(alpha,gamma-dimethylvaleronitrile), dimethyl and diethyl alpha,alpha'-azodiisobutyrate, 1,1'-azodicyclohexanecarbonitrile, etc. peroxy compounds such as organic peroxides, e. g., benzoyl peroxide, diethyl peroxide, di(tertiary butyl) peroxide, tertiary butyl pentamethylpropyl peroxide, etc., azines such as benzalazine, diphenyl ketazine, etc., oximes such acetoneoxime, camphoroxime, amine oxides, such as trimethylamine oxide, etc.

The concentration of catalyst may vary over a wide range. For reasons of economy and in order to obtain products of relatively high molecular weight it is generally desirable to use low catalyst concentrations, for example, from about 0.01 to about 1%, based on the combined weights of the sulfur dioxide, carbon monoxide, and ethylenically unsaturated organic compound or compounds in the charge. Lower molecular weight products may be desirable for many uses, and these are conveniently made with catalyst concentrations up to 15% or more.

Although the use of a reaction medium is not critical to operativeness, its use exerts a marked effect on the nature of the product. In general polar media lead to the obtainment of products which are much lower in softening point and more soluble than similar products made in non-polar media. Suitable polar media are water, methanol, isopropanol, acetic acid, etc. Examples of non-polar media are benzene, toluene, cyclohexane, isooctane, acetone, and the like.

The amount of reaction medium can equal the weight of the sulfur dioxide in the charge or it can be as much as 600 or more fold the weight of the sulfur dioxide. Usually, an amount of solvent is used which varies from 10 to 500 times the weight of the sulfur dioxide in the charge.

The products of this invention can be made at temperatures varying from 25° C. to as high as 350° C. or higher. Usually temperatures varying from 50 to 175° C. are used because under these conditions good reaction rates with good polymer yield are obtained.

In the examples the carbon monoxide has been injected into the reactor to a predetermined pressure value, and the ethylenically unsaturated compound has then been added until the desired gas mixture composition has been obtained. There is nothing critical about this and, if desired, the carbon monoxide and ethylenically unsaturated compound may be added as a mixture of predetermined composition.

If the ethylenically unsaturated organic compound is normally a liquid it may be added before addition of the sulfur dioxide, along with the sulfur dioxide, or after addition of the sulfur dioxide.

The molecular weight of the polymers is affected by such variables as nature of the reaction medium, amount of catalyst, temperature, and pressure. Generally, increased pressure leads to products of higher molecular weight.

Although the polymerization can be effected at pressures which range from atmospheric to the maximum permitted by the equipment employed, as a rule, products having molecular weights of at least 500 are obtained employing total pressures of from 100 atm., under the temperature conditions employed, to about 1500 atm.

The amount of sulfur dioxide in the polymer can be varied over wide limits. Thus the polymers of this invention correspond in composition to those having from 0.05 to 17 mole per cent sulfur dioxide, from 99.9 to 44 mole per cent ethylenically unsaturated compound, and from 0.05 to 39 mole per cent carbon monoxide. The best products from the standpoint of solubility and color are those having sulfur dioxide content in the range of 0.10 to 10 mole per cent, ethylenically unsaturated compound content in the range of 99 to 51 mole per cent and carbon monoxide content in the range of 0.9 to 39 mole per cent. These represent the preferred compositions.

The properties of the polymers vary widely, depending upon the polymer components and proportions in which they are employed, the nature of the reaction medium, the temperature and pressure, and the nature and amount of catalyst. These properties are different in an unexpected manner from the known properties of either carbon monoxide/ethylene polymers or from those of olefin/sulfur dioxide polymers. Thus, as shown in Example III, the presence of as little as 0.3% sulfur in the polymer profoundly affects the properties of the product. The polymer does not melt at temperatures below 240° C., whereas ethylene/carbon monoxide polymers melt at 160–170° C. Ethylene/sulfur dioxide polymers are intractable, infusible products, whereas the ethylene/carbon monoxide/sulfur dioxide polymer can be pressed into clear films.

The products of this invention are useful in a wide variety of applications, including molded objects, coatings for flexible and rigid substrates, etc. In many cases their utility may be enhanced either by chemical modification or by blending them with plasticizers, organic and inorganic fillers, pigments, etc.

As many apparently widely different embodiments of this invention may be made without departing from the spirit and scope thereof, it is to be understood that this invention is not limited to the specific embodiments thereof except as defined in the appended claims.

I claim:

1. A three-component solid polymer consisting of from .10 to 10 mole per cent of sulfur dioxide, from .90 to 39 mole per cent of carbon monoxide and from 99 to 51 mole per cent of a polymerizable aliphatic monoolefinic hydrocarbon containing a terminal methylene group and from 2 to 4 carbon atoms.

2. A three-component solid polymer consisting of from .10 to 10 mole per cent of sulfur dioxide, from .90 to 39 mole per cent of carbon monoxide and from 99 to 51 mole per cent of ethylene.

3. A method for polymerizing carbon monoxide with sulfur dioxide which comprises subjecting a mixture of sulfur dioxide, carbon monoxide and a polymerizable aliphatic monoolefinic compound containing terminal ethylenic unsaturation to a temperature of 25° to 350° C. under a pressure of 100 to 1500 atmospheres in the presence of a free-radical generating polymerization catalyst.

4. A method for polymerizing carbon monoxide with sulfur dioxide which comprises subjecting a mixture of sulfur dioxide, carbon monoxide and a polymerizable aliphatic monoolefinic compound containing terminal ethylenic unsaturation and from 2 to 4 carbon atoms to a temperature of 25° to 350° C. under a pressure of 100 to 1500 atmospheres in the presence of a free-radical generating polymerization catalyst.

5. A method for polymerizing carbon monoxide with sulfur dioxide which comprises subjecting a mixture of sulfur dioxide, carbon monoxide and a polymerizable aliphatic monoolefinic hydrocarbon containing a terminal methylene group and from 2 to 4 carbon atoms to a temperature of 50° to 175° C. under a pressure of 100 to 1500 atmospheres in the presence of a free-radical generating polymerization catalyst.

6. A method for polymerizing carbon monoxide with sulfur dioxide which comprises subjecting a mixture of sulfur dioxide, carbon monoxide and ethylene to a temperature of 50° to 175° C. under a pressure of 100 to 1500 atmospheres in the presence of a free-radical generating polymerization catalyst.

7. A method as set forth in claim 6 in which said free-radical generating polymerization catalyst is an azo polymerization catalyst.

8. A method as set forth in claim 6 in which said free-radical generating polymerization catalyst is a peroxy polymerization catalyst.

9. A three-component solid polymer consisting of from .05 to 17 mole per cent of sulfur dioxide, from .05 to 39 mole per cent of carbon monoxide and from 99.9 to 44 mole per cent of a polymerizable aliphatic monoolefinic hydrocarbon containing a terminal methylene group.

10. A three-component solid polymer consisting of from .05 to 17 mole per cent of sulfur dioxide, from .05 to 39 mole per cent of carbon monoxide and from 99.9 to 44 mole per cent of ethylene.

ROBERT D. LIPSCOMB.

REFERENCES CITED

The following references are of record in the file of this patent:

UNITED STATES PATENTS

| Number | Name | Date |
| --- | --- | --- |
| 2,471,959 | Hunt | May 31, 1949 |